United States Patent
Evans

[11] Patent Number: 5,609,181
[45] Date of Patent: Mar. 11, 1997

[54] TUBE CONNECTOR AND TAPPING DEVICE

[76] Inventor: Donald L. Evans, 1405 Huntington Cir., Reno, Nev. 89509

[21] Appl. No.: 626,471

[22] Filed: Apr. 2, 1996

[51] Int. Cl.⁶ .............................. F16K 43/00; F16L 41/06
[52] U.S. Cl. .............................. 137/318; 222/91; 285/197; 408/95
[58] Field of Search .............................. 137/15, 315, 318; 285/197, 198, 199; 222/91; 408/95

[56] References Cited

U.S. PATENT DOCUMENTS

| | | | |
|---|---|---|---|
| 3,252,475 | 5/1966 | Jones | 137/318 |
| 3,620,245 | 11/1971 | Finney et al. | 137/318 |
| 4,112,944 | 9/1978 | Williams | 137/318 |
| 4,294,470 | 10/1981 | Tucker | 285/197 |
| 4,391,458 | 7/1983 | Blakeley | 285/197 |
| 4,541,447 | 9/1985 | Soumar et al. | 137/318 |
| 5,054,820 | 10/1991 | Lesquir et al. | 285/197 |
| 5,170,813 | 12/1992 | Francis | 137/15 |
| 5,301,532 | 4/1994 | Bickmore et al. | 137/318 |
| 5,345,964 | 9/1994 | Friedel | 137/318 |
| 5,353,831 | 10/1994 | Roth | 137/318 |

FOREIGN PATENT DOCUMENTS

| | | | |
|---|---|---|---|
| 1486484 | 6/1967 | France | 285/197 |
| 2600508 | 7/1977 | Germany | 285/197 |

*Primary Examiner*—George L. Walton
*Attorney, Agent, or Firm*—Ian F. Burns

[57] ABSTRACT

A tapping device and method are provided for tapping tubing. The device comprises a tube portion which substantially encloses a tube, a spring portion which provides a clamping force to the tube portion, and a guide portion which guides and supports tube piercing instruments and taping fixtures. In normal operation, a section of tubing is inserted into the tube portion and the spring portion is pressed together to create a clamping force in the tube portion. Locking members are provided for maintaining the spring portion in a force producing position. Tube piercing instruments and tapping fixtures may then be inserted in the guide portion. The device ensures that the instruments and fixtures are inserted in the correct orientation and the device helps prevent leaks from occurring.

5 Claims, 2 Drawing Sheets

TUBE CONNECTOR AND TAPPING DEVICE

BACKGROUND OF THE INVENTION

1. Field of Invention

This invention relates to a device and method for tapping tubing in a fluid or gas transportation system for the attachment of spur lines, valves, and other devices.

2. Description of the Related Art

Liquid transportation systems, such as irrigation systems, employ tubing to conduct liquid from a source to a different location. It is often desirable to divert some amount of liquid from the main line to spur lines or devices which use the liquid. One common method of diverting liquid from a main line is to introduce a T-fitting. T-fittings have at least three openings through which liquid may flow and they are added to the main line by severing the line at an appropriate location and inserting the T-fitting between the severed sections. Liquid may flow through the T-fitting and continue down the main line and some amount of liquid may be diverted from the main line through the stem of the T-fitting. The stem of the T-fitting may be attached to spur lines, valves, sprinklers, nozzles, or other devices which require liquid from the main line.

T-fittings have several disadvantages: they reduce the structural integrity of the system; they reduce the pressure in the down stream portion of the main line; and, they are prone to leaks. Because the main line is completely severed, the structural integrity is reduced and it is more susceptible to unintended separation. Liquid pressure and external forces can completely separate one of the sections of the main line from the T-fitting. T-fittings also reduce liquid pressure in the main line because they usually have a smaller inner diameter. This produces friction and turbulence in the stream of liquid and reduces pressure down stream of the T-fitting. Finally, T-fittings have a large amount of joint surfaces between which leaks can occur. Over the life of the T-fitting, leaks may occur which waste liquid and further reduce liquid pressure.

Other devices that are often used to divert water from a main line include tapping fixtures. Tapping fixtures are introduced into the main line by puncturing the wall of the line thereby creating a small hole. The fixtures are usually inserted into the hole or are held against the tube by a tapping device.

Tapping fixtures have several advantages over T-fittings. Tapping fixtures do not reduced the structural strength of the main line as much as T-fittings, they do not reduce the down stream pressure as much as T-fittings and they are less likely to leak. Unlike T-fittings, tapping fixtures do not completely sever the main line; only a small hole is required. Thus, the main line is stronger and less likely to separate. Tapping fixtures also do not reduce the diameter of the main line which helps to maintain the down stream pressure of the main line. Finally, tapping fixtures are less likely to leak because there are significantly less joint surfaces between which leaks may occur.

However, tapping fixtures do have disadvantages. Some tapping fixtures are inserted into a line and held in place only by ridges or teeth; no supporting structure is used. These kinds of fixtures tend to leak and work free of the tubing over time. It has been found that tapping fixtures are much more reliable if they are supported by a device which clamps the main line. Three such devices are disclosed in U.S. Pat. No. 5,170,813 to Francis, U.S. Pat. No. 5,345,964 to Friedel, and U.S. Pat. No. 5,353,831 to Roth. These devices generally help support tapping fixtures. Although these clamping devices are useful, they are bulky, have many parts, require many steps to install, are susceptible to corrosion, and are expensive to manufacture. For example, all of the devices utilize bolts to fasten the device to a main line. This requires the operator to go through several steps to attach the device to a main line. In addition, the user is required to carry wrenches to tighten the device which may be inconvenient. The bolts and other metal parts of these devices are also susceptible to corrosion.

Although the discussions above and below make reference to fluid transportation systems, such as irrigation systems, it is recognized that gas transportation systems are equally applicable. The problems encountered with T-fittings and tapping fixtures in fluid transportation systems are also found in gas transportation systems. The present invention may be used to solve these problems in both kinds of systems.

SUMMARY OF THE INVENTION

1. Brief Description of the Invention

The present invention comprises a tapping device which guides and supports tapping fixtures and tube piercing instruments. The tapping device is an integrally formed single part with several portions. The device is preferably formed of a flexible plastic through injection molding. The tapping device has a tube portion which surrounds and clamps a tube, a spring portion which provides a clamping force to the tube portion, and a guide portion which guides and supports tapping fixtures and tube piercing instruments.

The tube portion comprises walls which define a substantially cylindrical shape. However, the tube portion has a C-shaped appearance when viewed from the side because of a gap between the walls. The gap runs the width of the tube portion and is defined by two wall ends. A hinge may be included in one or both walls of the tube portion. The hinge is a V-shaped groove which extends the width of the wall and allows the wall of the tube portion to bend outward without breaking the wall. When placing the tapping fixture on a tube, the tube portion wall is bent outward so that the gap becomes larger and the tube may be inserted through the gap. This configuration allows the device to be used anywhere along the length of a tube. It is not necessary to thread the tube through the device and move the device to the desired location.

The spring portion is formed by two spring members that appear to be semicircular when viewed from the side. Each spring member is attached to the wall of the tube portion and each spring member has an end surface for abutting the other spring member's end surface. Each spring portion also has a hook member which projects inward from the inner surface of the spring member. Each hook member has a barb or hook that is designed to engage the other hook member. When the spring members are squeezed together, the spring members deform and the hook members engage each other and hold the spring members in a deformed position. In this deformed position, an elastic recovery force is produced which produces a clamping force on the walls of the tube portion. The clamping force holds the tube portion in a fixed position relative to the tube.

The guide portion is substantially cylindrical and it is attached to the tube portion. A bore hole extends from the guide portion through the wall of the tube portion. The surface of the bore hole may have threads to assist the insertion of a piercing instrument and tapping fixtures. In normal operation, a piercing instrument is first inserted into the guide portion and a hole is cut into the tube. The piercing instrument is then removed and a tube nipple is then inserted into the guide portion so that the end of the tube nipple either abuts the tube or is partially inserted into the tube. The tapping device holds the tube nipple in place and prevents leaks from forming. Spur lines and devices which require fluid may be attached to the tube nipple. In addition to tube nipples, other tapping fixtures, which perform other functions, may be installed in a similar manner.

2. The Object of the Invention

It is an object of the present invention to provide a tapping device for guiding and supporting tube piercing instruments and tapping fixtures.

It is a further object of the present invention to provide a tapping device which is composed of only one integrally formed part.

It is a further object of the present invention to provide a tapping device which may be inexpensively manufactured.

It is a further object of the present invention to provide a tapping device which is highly resistant to corrosion.

It is a further object of the present invention to provide a tapping device which requires no tools to install.

It is a further object of the present invention to provide a tapping device which may be used on both large and small diameter tubing.

It is a further object of the present invention to provide an improved method for tapping fluid conducting lines.

These and other objects and advantages of the present invention may be realized by reference to the remaining portion of the specification and drawings.

| REFERENCE NUMBERS | |
| --- | --- |
| 2 | tapping device |
| 4 | main line tube |
| 10 | tube portion |
| 12 | spring portion |
| 14 | guide portion |
| 16 | wall |

| REFERENCE NUMBERS | |
| --- | --- |
| 17 | wall |
| 18 | wall end |
| 19 | hinge |
| 20 | wall end |
| 22 | gap |
| 24 | spring member |
| 26 | spring member |
| 28 | hook |
| 30 | hook |
| 32 | spring member end |
| 34 | spring member end |
| 36 | piercing instrument |
| 38 | threads |
| 40 | tap |
| 42 | handle |
| 44 | piercing tube |
| 46 | tube nipple |
| 48 | threads |
| 50 | handle |
| 52 | channel |
| 54 | barb |

DESCRIPTION OF THE PREFERRED EMBODIMENT

Figure 1A:
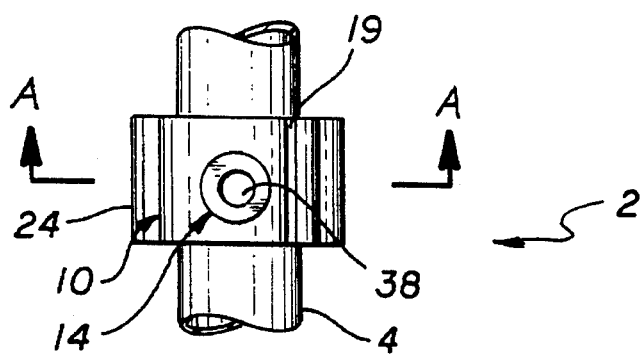
FIG. 1A is a top view of the tapping device of the present invention showing the device in use with a fluid conducting tube.
Figure 1B:
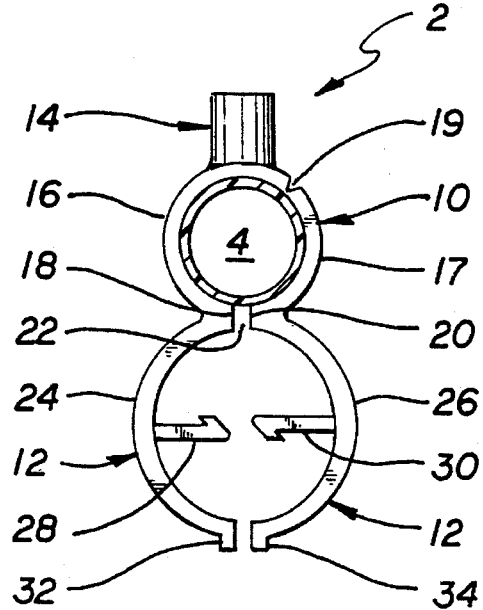
FIG. 1B is a side view of the tapping device.
Figure 1C:
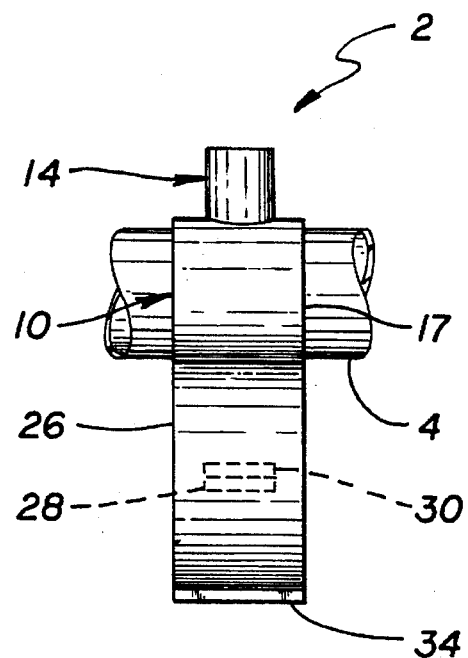
FIG. 1C is a from view of the tapping device.

As seen in FIGS. 1A, 1B, and 1C, the tapping device 2 of the present invention clamps a main line tube 4. Tapping device 2 is an integrally formed unit which may be made of a number of flexible materials. In the preferred embodiment, tapping device 2 is made of polypropelene plastic that is flexible, strong enough to withstand significant loads, resistant to ultraviolet radiation, highly resistant to corrosion, and efficient to manufacture. Tapping device 2 is preferably formed by injection molding in a manner that is well known in the art. However, other methods, such as extrusion, may also be used. Tapping device 2 may be manufactured to accommodate a large number of tube sizes. A common application of the device would be on half-inch main line tube with a quarter spur line tube.

Tapping device 2 comprises a tube portion 10, a spring portion 12, and a guide portion 14. Tube portion 10 has walls 16 and 17 which form a substantially cylindrical shape with a C-shaped cross section. Wall 17 has a hinge 19 which is a V-shaped groove formed into wall 17. Hinge 19 allows wall 17 to be bent outward so as to allow a tube to be inserted in tube portion 10. Walls 16 and 17 have wall ends 18 and 20 respectively, which define a gap 22. Spring portion 12 comprises spring members 24 and 26 which have a substantially semicircular appearance when viewed from the side as in FIG. 1B. Hooks 28 and 30 extend inward from spring members 24 and 26, respectively. Spring members 24 and 26 also have end portions 32 and 34 respectively.

Figure 2:
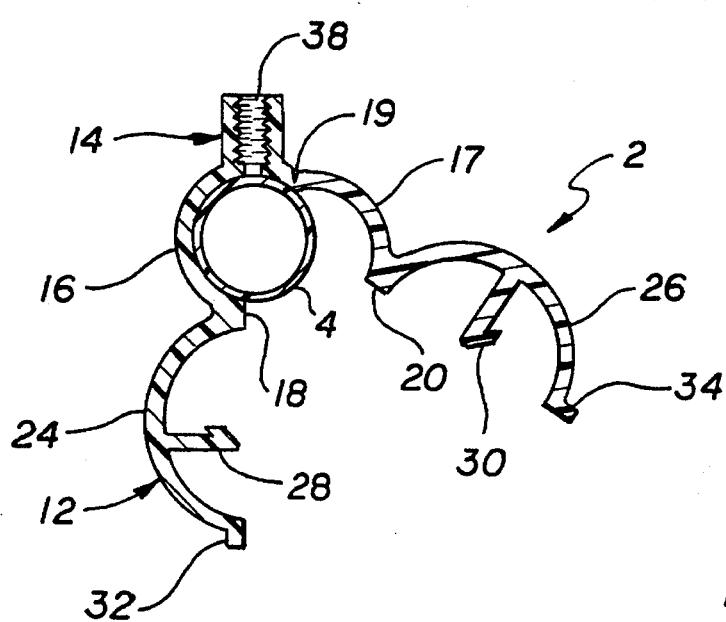
FIG. 2 is a cross-sectional view of the tapping device taken from line A of FIG. 1A showing the hinge in operation with a main line tube.

In normal operation, it is necessary to insert a main line tube into tapping device 2. As demonstrated in FIG. 2, this is accomplished by bending wall 17 and attached spring member 26 away from wall 16 and attached spring member 24 so as to widen gap 22. Wall 17 is designed to bend at hinge 19. Once gap 22 is wide enough, a tube may be inserted into tube portion 10. Tapping device 2 may now be positioned on the tube to provide the appropriate orientation for spur lines or other devices. This configuration allows tapping device 2 to be positioned anywhere along the length of main line tube 4 without threading tube 4 through tube portion 10.

Figure 3:
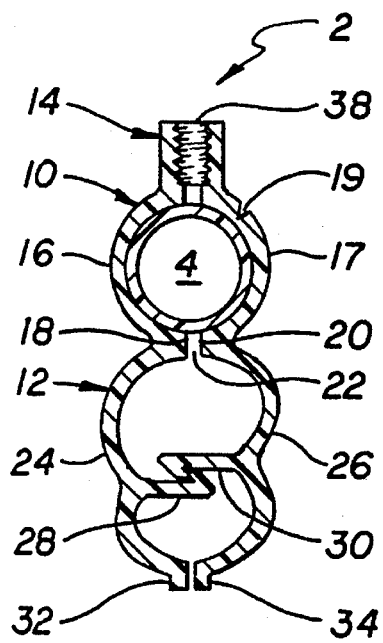
FIG. 3 is a cross-sectional view of the tapping device taken from line A of FIG. 1A showing the device in a clamped position before piercing and tapping the main line.

As seen in FIG. 3, tapping device 2 is secured to main line tube 4 by pressing spring members 24 and 26 together so that ends 32 and 34 abut each other and hooks 28 and 30 engage each other. When hooks 28 and 30 are engaged, spring members 24 and 26 are unable to return to a relaxed position. In this non-relaxed position, a return force is created in each spring member which causes a clamping force in walls 16 and 17 thereby causing tube portion 10 to firmly clamp main line tube 4. It is recognized that the spring portion of the present invention can take a number of different forms and still achieve the same results of the embodiment described above.

Figure 4:
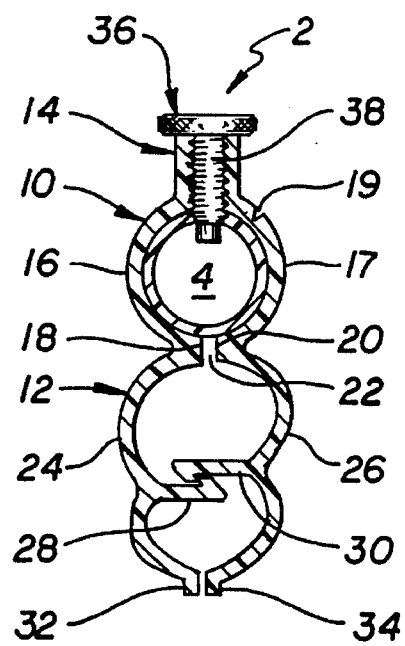
FIG. 4 is a cross-sectional view of the tapping device taken from line A of FIG. 1A showing a main line tube being pierced by a piercing instrument.
Figure 5:
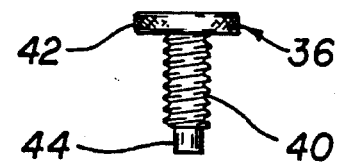
FIG. 5 is a side view of a piercing instrument which may be used with the tapping device.

As seen in FIGS. 4 and 5, a piercing instrument 36 may be used to pierce a hole in main line tube 4. Guide portion 14 is provided with threads 38 for engaging tap 40 of piercing instrument 36. Piercing instrument 36 is also provided with a handle 42 for allowing the user to easily rotate the device. When piercing instrument 36 is threaded into guide portion 14, cutting tube 44 cuts a hole in main line tube 4. It is recognized that piercing instrument 36 may take a number of different cutting shapes. For example, a sharp pin or drill may be used to pierce the tube.

Figure 6:
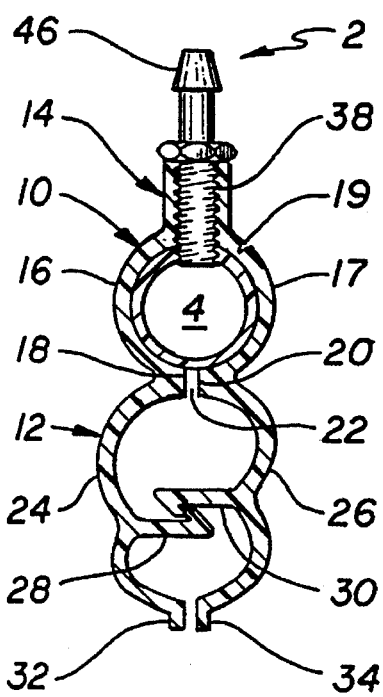
FIG. 6 is a cross-sectional view of the tapping device taken from line A of FIG. 1A showing a tube nipple inserted in a main line tube.
Figure 7:
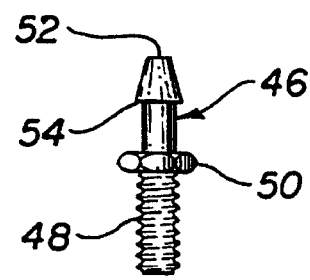
FIG. 7 is a side view of a tube nipple which may be used with the tapping device.

As seen in FIGS. 6 and 7, once a hole is cut in the main line tube, piercing instrument 36 is withdrawn and a tube nipple 46 may be threaded into guide portion 14. Tube nipple 46 has threads 48, a handle 50, a barb 54, and a channel 52. In normal operation, barb 54 will hold a spur line on tube nipple 46 and liquid or gas can be conducted from the main line through channel 52 into the spur line. It is recognized that piercing instrument 36 and tube nipple 46 may be combined into a single unit. It is also recognized that tube nipple 46 may include a valve, a sprinkler, a drip nozzle, or other device that requires a liquid or gas supply.

SUMMARY

As is apparent from the above description, the present invention offers a tapping device which is inexpensive to manufacture, is easy to install at any location on a tube and requires no tools when the device is installed in the field. The invention may be made of only one part and it may be made of a material which is inert to many chemicals and highly resistant to corrosion and degradation. The tapping device of the present invention is highly flexible in that a wide variety of tube sizes may be accommodated and a large number of devices may be easily connected to the main line.

It will be apparent that various modifications can be made to the tapping device and method described above and as shown in the drawings within the scope of the present invention. The size, configuration, and arrangement of components can be different to meet specific requirements. Therefore, the scope of the present invention is to be limited only by the following claims:

What is claimed is:

1. A tapping device for tapping a tube, comprising (A) a tube portion for clamping and substantially enclosing a section of the tube, said tube portion having a substantially cylindrical shape and a substantially C-shaped cross section, (B) at least two substantially semicircular shaped spring members formed of elastic material, each said spring member having a proximal and distal end and a central portion located between said proximal and distal ends, each said proximal end being attached to said tube portion, one of said distal ends being adapted to abut said other distal end, and locking means attached to said central portions of said spring members for holding said spring members in a deformed position, whereby said spring members may be pressed together to elastically deform said spring members, an elastic recovery force being created in said spring members, a clamping force being created in said tube portion for firmly clamping the tube, and said locking means holding said spring members in a deformed position, and (A) a guide portion associated with said tube portion for guiding and supporting tube piercing instruments and tapping fixtures.

2. The tapping device of claim 1 wherein said tube portion, said spring means, and said guide portion are an integrally formed single unit.

3. The tapping device of claim 1 wherein said tube portion comprises hinge means for aiding in the opening of said tube portion for insertion of tubing.

4. The tapping device of claim 3 wherein said hinge means comprises a groove in said tube portion.

5. The tapping device of claim 1 wherein said guide portion comprises a bore, said bore being substantially, perpendicular to the section of tube, whereby the tube piercing instruments and tapping fixtures are guided and supported in a position which is substantially perpendicular to the section of tube.

* * * * *